United States Patent [19]

Ellis et al.

[11] 4,188,436
[45] Feb. 12, 1980

[54] NON WOVEN FABRICS WITH PATTERN OF DISCRETE FUSED AREAS

[75] Inventors: Peter M. Ellis; Alan Selwood, both of Harrogate, England

[73] Assignee: Imperial Chemical Industries Limited, London, England

[21] Appl. No.: 921,517

[22] Filed: Jul. 3, 1978

[30] Foreign Application Priority Data

Apr. 8, 1976 [GB] United Kingdom ............... 14360/76

[51] Int. Cl.² .............................................. B32B 7/14
[52] U.S. Cl. .................................................... 428/198
[58] Field of Search ......................................... 428/198

[56] References Cited

U.S. PATENT DOCUMENTS

| | | | |
|---|---|---|---|
| 2,705,686 | 4/1955 | Ness | 428/198 |
| 2,705,687 | 4/1955 | Petterson | 428/198 |
| 3,009,822 | 11/1961 | Drelich | 428/198 |
| 3,087,833 | 4/1963 | Drelich | 428/198 |
| 3,542,634 | 11/1970 | Such | 428/198 |
| 3,949,128 | 4/1976 | Ostermeier | 428/198 |

*Primary Examiner*—Marion E. McCamish
*Attorney, Agent, or Firm*—Cushman, Darby & Cushman

[57] ABSTRACT

Abrasion resistant segmentally bonded non woven fabrics prepared from very highly parallelised staple fibre webs are described wherein the bonding pattern is applied to the web in a defined manner related to the direction of fibre orientation in the webs.

13 Claims, 4 Drawing Figures

NON WOVEN FABRICS WITH PATTERN OF DISCRETE FUSED AREAS

This is a continuation in part of application Ser. No. 785,941 filed Apr. 8, 1977 now abandoned.

The invention relates to highly ordered fibre webs and to non-woven fabrics produced there from in which fibres are bonded together in discrete spaced apart areas separated from each other by areas in which the fibres are essentially unbonded.

Such non-woven fabrics, which have been referred to as point-bonded or segmentally bonded non-woven fabrics, have been described extensively in the patent literature. Although the properties of such fabrics can be varied widely by varying the number of bonded areas per unit area of fabric, as well as their size, shape and the pattern in which they are arranged, it is noticeable that a high resistance to abrasion (together with high tensile and tear strengths) cannot be achieved if the fabric is also required to be drapeable. The reason for this is well understood—in order to obtain a high resistance to abrasion it is necessary that the fabric has an appreciable percentage of its total area occupied by bonded areas, in order that the structure does not pill when its surface is abraded. On the other hand, a requirement of a drapeable fabric is fibre mobility, achievable by a relatively small percentage of the total area occupied by bonded areas.

We have now discovered a point-bonded non-woven fabric which possesses such excellent resistance to abrasion that a non-woven fabric having a better combination of abrasion resistance with drapeability than heretofor achievable can now be produced.

Accordingly, the invention provides a non-woven fabric comprising at least two layers of fibres bonded in a pattern of discrete fused areas, wherein the fibres in at least the outer layers exhibit a predominating direction of orientation and at least one layer includes or consists of fibres having an orientation orthogonal to the predominating direction of orientation in the other layer or layers and the maximum distance between bonded areas at at least one surface measured in the direction of fibre orientation is not more than 10 mm and the bonded areas are so arranged that a projection of the bonded areas within this maximum distance onto a line perpendicular to the predominating direction of fibre orientation is continuous.

We prefer that the minimum distance between bonded areas in the direction of fibre orientation should be not less than 0.75 mm, more preferably not less than 1 mm, since otherwise the bonded fabric is unduly stiff.

Whilst it is only necessary that the projection of bonded areas onto a line perpendicular to the predominating direction of fibre orientation is continuous, we prefer that there be a small amount of overlap at the ends of the projections of neighbouring bonds onto that line to minimise the possibility of a fibre meandering around the ends of bonded areas without being bonded to adjacent fibres and hence being susceptible to breakage when the surface is abraded.

In this specification unless otherwise indicated the terms fibres or fibre webs or layers are used broadly to include both staple fibres and continuous filaments and webs thereof. By the phrases "webs having a predominating direction of orientation" and "highly ordered webs" we mean webs having a degree of parallelism of fibres in the web significantly higher than that obtained by a simple carding process as applied to staple fibres. Such an enhanced degree of parallelism of staple fibres may be obtained by subjecting a carded web to an additional fibre orienting step during the carding operation. Continuous filament layers may be produced, for example, by arranging a number of spinnerets side-by-side and collecting the extruded filaments on a fast moving conveyor having means to maintain the required degree of predominant orientation. Alternatively a tow of continuous filaments can be opened to form a sheet of filaments using the threaded roll apparatus described in British patent Specification No. 1,105,968. Again a warp of closely aligned low twist yarns, of continuous filaments, or spun from staple fibres may be used.

It is however preferred to prepare a highly ordered web by subjecting a plurality of staple fibre slivers including at least some potentially crimpable fibres to a treatment in which the slivers are spread and merged into a band and then subjected to a heat treatment. A process of this kind is described in more detail in copending application Ser. No. 939,711 filed Sept. 5, 1978 which is a division of the aforementioned application Ser. No. 785,941. In this process the slivers are led between at least three pairs of rollers which draft the fibres and spread and merge the slivers laterally into a single band which is then subjected to a heat treatment under conditions allowing some contraction of the fibres to effect crimping of the crimpable fibres and formation of a coherent highly ordered web.

In preparing a fibre web for bonding a single web may be used or a plurality of webs may be laid one upon the other to produce a multiple layer assembly.

In order to predict and control a process for producing a highly ordered coherent web according to this invention the following relationship may be used:

$$W = \frac{100}{S} m \frac{1}{D} (1 + \frac{f}{100})$$

where
W is the weight, in g/m², of the final coherent ordered web,
s is the spacing, in centimeters, between slivers as fed to the first pair of rolls.
m is the weight of a sliver in g/m.
D is the total draft up to but not including the heat treatment stage and
f is the percentage overfeed in the heat treatment stage.

Operation of a process according to this relationship readily allows selection of the various process variables. Since the value of overall draft is inserted in the foregoing relationship there is possibly a further selection within the overall value, D, of the number of stages and the degree of draft, if any, at each stage. In a preferred form of the process three stages are employed and in the intermediate stage substantially no drafting preferably a small overfeed is employed.

The fibres of a web may include natural or artificial fibres or synthetic fibres spun from linear organic polymeric materials, as for example, melt spinnable polyesters, polyamides and copolymers of these classes of organic linear polymers. At least some of the fibres in a web should be synthetic thermoplastic fibres since these may be bonded by simple and effective thermal means and may be readily produced in both staple fibre and continuous filament forms and potentially crimpable forms, as for example bicomponent fibres in which at least part of one component present at the surface of the fibres is of lower softening or melting point and different shrinkage propensity than the other component.

If desired the fibres comprising a web may be initially crimped but it is preferred as described in said copending Ser. No. 939,771 to develop at least some crimp during preparation of a highly ordered web to induce coherence in the web due to interaction of crimps between fibres. It is highly preferable that the amplitude of the crimp is small compared to the bond size and the spacing between neighbouring bonded areas. It is desirable also that the frequency of crimp is high, there being desirably more than 10 crimps in the fibres in the maximum distance between bonded areas measured in the direction of predominating fibre orientation.

A non-woven fabric according to the invention is prepared by assembling together at least two fibre layers both of which if only two are used or at least the outer layers if more than two are used, are highly ordered fibre layers with some degree of orthogonality of fibre orientation in at least one layer. After assembly the composite web is bonded with a pattern of discrete bonds set in relation to the direction of fibre orientation of an outer layer.

Individual fibre layers may be assembled by cross- or forward-lapping of fibre webs, preferably already having the desired high degree of fibre orientation and multiple layers are prepared by a suitable process of lamination so as to substantially preserve the desired orientation within the layers.

Whilst it is necessary that fibres lying at at least the surfaces exhibit a predominating direction of orientation, fibres within the thickness of the fabric are not necessarily so restricted and may if desired be randomly arranged. It is not necessary that the directions of fibre orientation at both surfaces be the same, although for reasons of simplicity in the selection of the pattern of bonded areas to accord with the requirements of the invention, it is preferred that the direction of fibre orientation at one surface is substantially parallel to, or substantially at right angles to, the direction of fibre orientation at the other surface.

Bonding is effected by heating, for example, by passing the fibrous assembly through the nip of a hot calender press, at least one roll of which bears a pattern of discrete bonds which corresponds to the desired pattern of bonded areas. An alternative method of bonding employs an ultrasonically energised horn acting in conjunction with a patterned anvil.

A bonded fabric according to the invention has properties approaching those of a woven fabric in that orthogonally directed fibres provide a resistance to extension and a lack of elasticity in the direction transverse to the predominating direction of fibre orientation and the specified bonding pattern provides good resistance to abrasion without deleteriously affecting the other properties desired for use of the fabric in apparel. By selecting the pattern to meet the stated criteria in relation to the predominating fibre orientation direction a wide range of fabrics with differing properties may be produced without necessarily changing the expensive patterned bonding rolls.

IN THE DRAWINGS

The invention is illustrated by the following Examples.

EXAMPLE 1

A quantity of polyester bicomponent fibres (3.3 decitex 60 mm length with components arranged side-by-side, one component being polyethylene terephthalate and the other being a copolymer of 15 mole percent ethylene isophthalate and 85 more percent ethylene terephthalate) was assembled into a sliver weighing 3.5 g/meter. Eight of such slivers were introduced side-by-side into a two stage drafting frame. The ratio of speeds between first and second roller pairs was 1 to 1.8, and between second and third roller pairs was 1 to 6. The fibres of the slivers under these conditions opened and merged to form a sheet in which the fibres were substantially parallel to each other. The sheet was heated by hot air at about 150° C. between the third roller pair and a fourth roller pair, the speed of the fourth pair being one half of that of the third pair. The heat treatment caused the fibres to develop a low amplitude, high frequency helical crimp, which imparted a degree of coherency to the fibrous sheet enabling it to be handled in subsequent steps. The weight of the sheet was about 29 g m$^{-2}$.

Four portions of the web so formed were stacked, with the directions of fibre orientation in the first layer being perpendicular to that in the second layer, that of the third layer being the same as the second layer and finally that of the fourth layer being perpendicular to that of the third layer. This structure can be represented as ABBA where A and B refer to predominating directions of fibre orientation.

Figure 1:
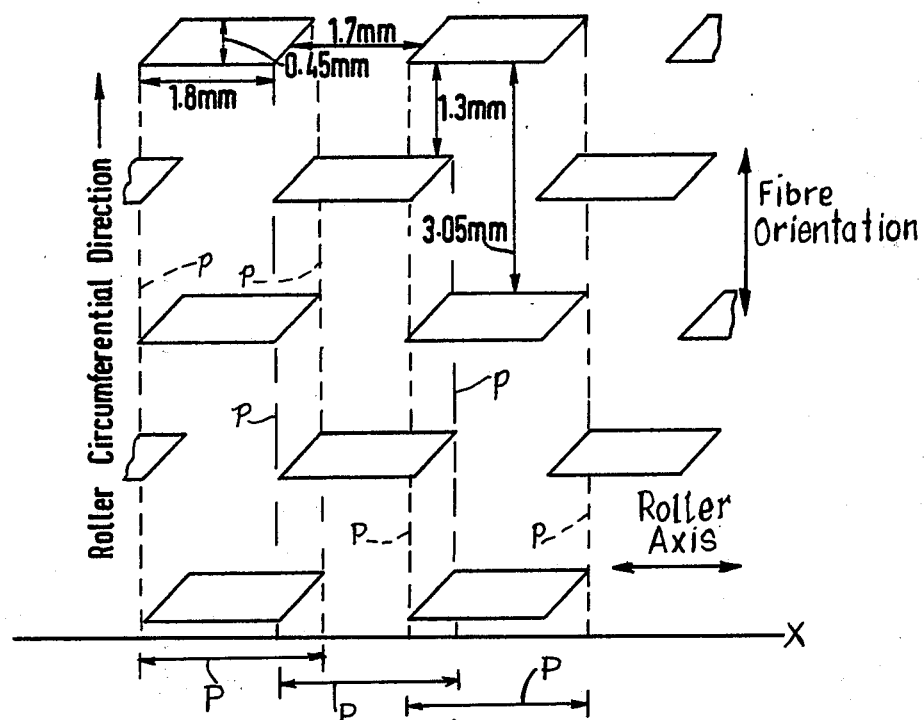
FIG. 1 is a schematic plan view of a fabric having a bond pattern in accordance with the principles of the present invention.

The multilayer structure (weighing about 116 m$^{-2}$) was passed between an ultrasonic horn operated at 20 KHz with 90 u peak-to-peak amplitude and an anvil in the form of a roller, and the applied pressure between the implements was adjusted to give bonding. The roller bore a pattern of parallelogram shaped lands 1.8×0.45 mm with the longer dimension across the machine direction in parallel rows 1.3 mm apart. The rows were parallel to the axis of the roller and the lands in each row were spaced apart by 1.7 mm. The lands in successive rows were staggered at an angle of 45° with respect to the axis of the roller. The pattern is illustrated in FIG. 1 which is not to scale. The multilayer structure was passed between horn and anvil with the predominating direction of orientation of the fibres in the surfaces perpendicular to the axis of the roller.

FIG. 1 also illustrates an imaginary line X which is perpendicular to the direction of fibre orientation and which lies in the plane of the fabric. Projections of the bonded areas along the broken lines p, which are parallel to the direction of fibre orientation, on to the line X are illustrated by the arrows P, and it will be seen that these arrows overlap, i.e. that the projections are continuous along the length of the line X.

The bonded product possessed exceptional abrasion resistance.

EXAMPLE 2

Figure 2:
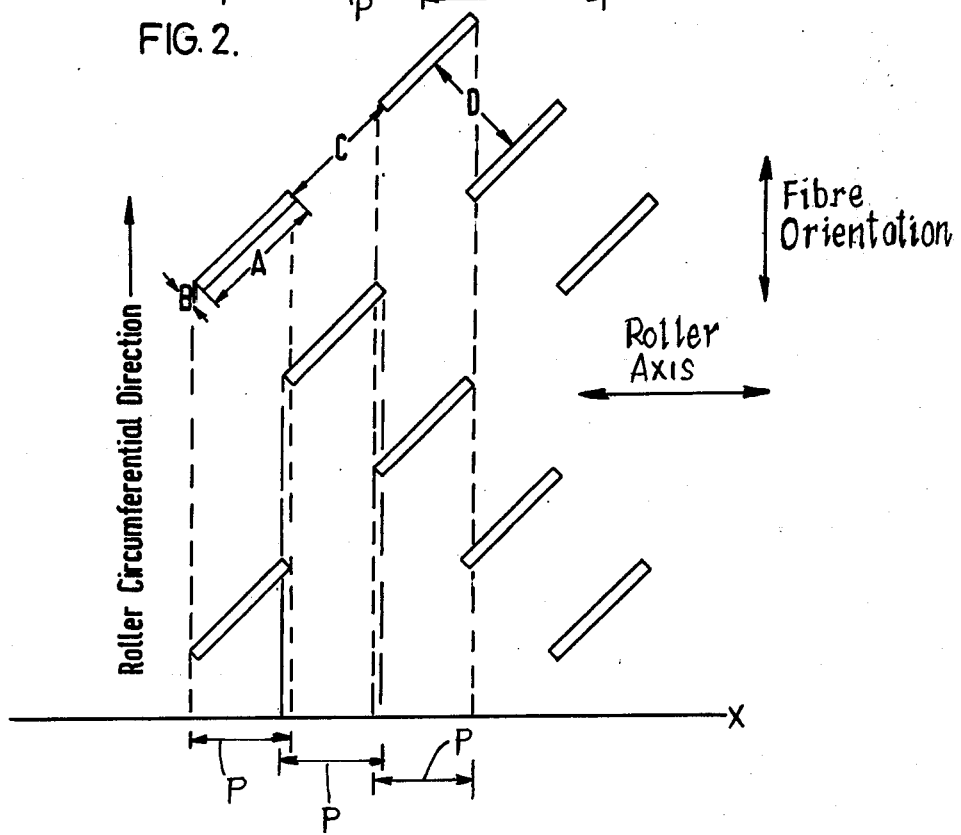
FIGS. 2 and 3 are similar views showing two other bond patterns embodying the principles of the present invention and FIG. 4 is a similar view showing a bond pattern which is outside the scope of the present invention.

Portions of the web formed as described in Example 1 were stacked in an ABAB configuration the angle between directions A and B being substantially 90° and bonded under the same conditions as described in Example 1, save in that the roller (anvil) had the following pattern. The roller bore a pattern of rectangular shaped lands 2.25×0.5 mm in parallel rows angled at 45° to the axis of the roller. The spacing between adjacent lands measured in the direction of their long dimension was 1.75 mm, and between adjacent lands in the direction of their short dimension was 1.5 mm. The pattern of lands is illustrated in the accompanying FIG. 2 which is not to scale. The dimensions indicated in the Figure are as follows:

A: 2.25 mm
B: 0.5 mm
C: 1.75 mm
D: 1.5 mm

As in FIG. 1 an imaginary line X is illustrated perpendicular to the direction of fibre orientation in the plane of the fabric. Projections of the bonded areas along broken lines p, parallel to the direction of fibre orientation, on to the line X are continuous along the length of the line X.

The bonded non-woven fabric was found to have a high resistance to abrasion on both of its surfaces, and had good dimensional stability and drape.

EXAMPLE 3

A quantity of polyester bicomponent fibres 3 denier 49 mm length, with the components arranged in eccentric core-sheath relationship, the core component being polyethylene terephthalate and the sheath being a copolymer of 15 mole percent ethylene isophthalate and 85 mole percent ethylene terephthalate was assembled into a sliver weighing 2.0 g/m. Seventeen such slivers were introduced side-by-side into a three stage drafting frame. The ratio of speeds between first and second roller pairs was 1 to 2.0, and between second and third rollers pairs was 1 to 0.95 and between third and fourth roller pairs was 1:3.5. The fibres of the slivers under these conditions opened and merged to form a sheet in which the fibres were substantially parallel to each other. The sheet was heated by hot air at about 170° C. between the fourth roller pair and a fifth roller pair, the speed of the fifth pair being 73% of that of the fourth pair. The heat treatment caused the fibres to develop a low amplitude, high frequency helical crimp which imparted a degree of coherency to the fibrous sheet enabling it to be handled in subsequent steps. The weight of the sheet was about 35 g m$^{-2}$.

Four portions of the web so formed were stacked, with the directions of fibre orientation in the first layer being the same as that in the second layer, that of the third layer being at an angle of 73° to the first and second layers and finally that of the fourth layer being the same as that of the third layer. This structure can be represented as AABB where A and B refer to predominating directions of fibre orientation.

The multilayer structure (weighing about 140 m$^{-2}$) was passed between an ultrasonic horn operated at 20 KHz with approximately 90 u peak-to-peak amplitude and an anvil in the form of a roller, and the applied pressure between the implements was adjusted to give bonding. The roller bore a pattern of parallelogram shaped lands 2.8×0.9 mm in parallel rows angled at 45° to the axis of the roller in the long direction of the lands and at 47° to the axis of the roller in the short direction of the lands. The spacing between lands measured in the direction of their long dimension was 4.1 mm and between adjacent lands in the direction of their short dimension was 3.8 mm. The pattern of lands is illustrated in the accompanying FIG. 3 which is not to scale. This shows that parallel fibres in the A layer angled at 82° to the roller axis were bonded with an interbond distance of 10 mm and that the fibres in the B layers were also bonded at the same spacing. The multilayer structure was passed between horn and anvil with the predominating direction of orientation of the fibres in the A or top surface at an angle of 82° to the axis of the roller.

Figure 3:
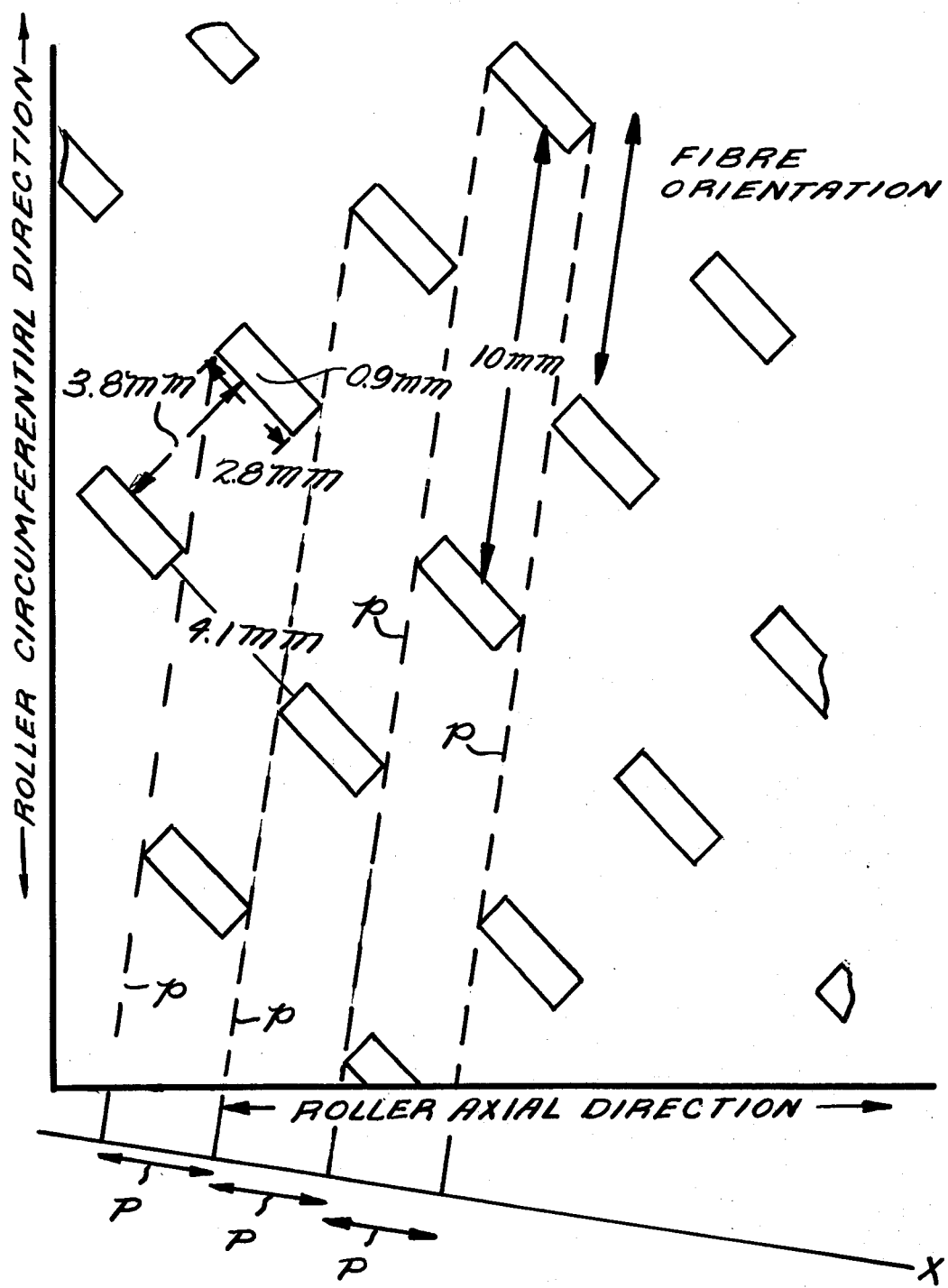

As in the previous figures an imaginary line X is illustrated in FIG. 3 perpendicular to the direction of fibre orientation, in the plane of the fabric. Projections of the bonded areas along broken lines p, parallel to the direction of fibre orientation, on to the line X are continuous although in this embodiment they do not overlap.

The bonded product was abraded by a Martindale abrasion tester for 2000 cycles and also for 5000 cycles. At 2000 cycles the surface was virtually unimpaired. At 5000 cycles some slight pills were detected.

COMPARATIVE EXAMPLE

A second multilayer structure made as in Example 3 save that the angle between the A and B layers was 88°, was bonded in the same way with the same pattern on the anvil roller as in Example 3, but the structure was passed between horn and anvil with the predominating direction of orientation of the fibres in the A surface at an angle of 45° to the axis of the roller.

Figure 4:
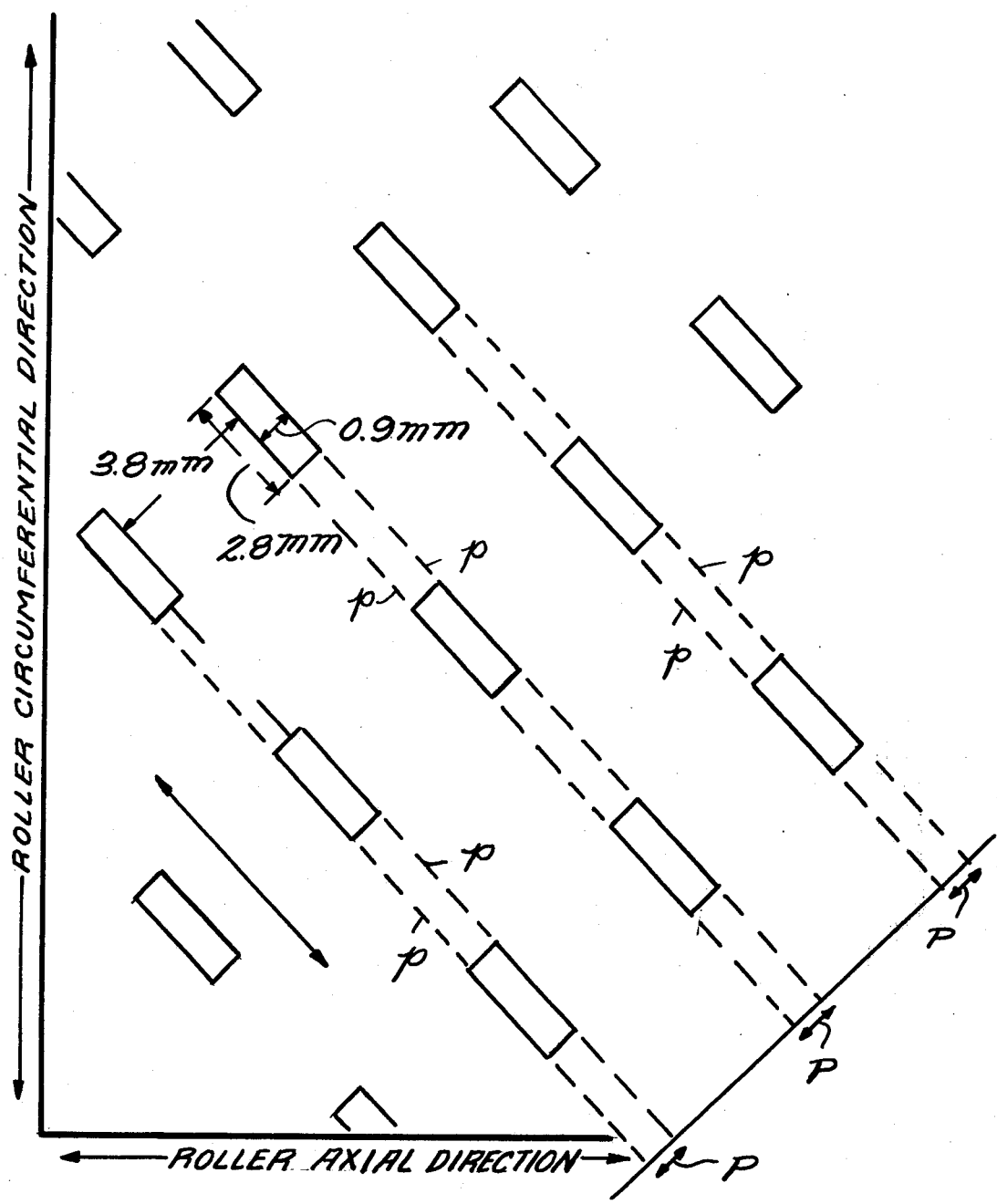

FIG. 4 illustrates the bond pattern. Again an imaginary line X is shown perpendicular to the direction of fibre orientation, in the plane of the fabric. Projections of the bonded areas along broken lines p, parallel to the direction of fibre orientation, on to the line X are spaced apart, i.e. are not continuous along the line X.

In this case which is not according to the invention, a significant proportion of the surface fibres were not bonded at regular intervals. When the bonded product was subjected to Martindale abrasion, the surface showed considerable deterioration at 2000 cycles and was severely damaged at 5000 cycles.

EXAMPLE 4

A further multilayer sample was made with the same configuration as Example 3 but the A and B layers were arranged at right angles to each other. The structure was bonded as before except that the roller pattern was that used in Example 2. With this pattern parallel fibres on the surfaces would be bonded at 5 mm intervals. The bonded product was subjected to the Martindale abrasion for 5000 cycles, and the surface was found to be virtually unimpaired.

We claim:

1. Non-woven fabric comprising at least two layers of fibres bonded in a pattern of discrete fused areas, wherein the fibres in at least the outer layers exhibit a predominating direction of orientation and at least one layer includes or consists of fibres having an orientation orthogonal to the predominating direction of orientation in the outer layer or layers and the maximum distance between bonded areas at at least one surface measured in the direction of fibre orientation is not more than 10 mm and the bonded areas are so arranged that a projection of the bonded areas within this maximum distance, in the direction of fibre orientation, onto a line perpendicular to the predominating direction of fibre orientation is continuous.

2. A fabric according to claim 1 wherein in the projection of the bonded areas onto the perpendicular there is a small overlap at the ends of the projections of neighbouring bonds.

3. A fabric according to claim 1 wherein the minimum distance between bonded areas in the direction of fibre orientation is not less than 1 mm.

4. A fabric according to claim 1 having at least three fibre layers.

5. A fabric according to claim 4 wherein all the layers are highly oriented fibre webs.

6. A fabric according to claim 4 wherein only the surface layers are highly oriented fibre webs.

7. A fabric according to claim 4 wherein the orientation direction of fibres in the outer layers is the same.

8. A fabric according to claim 3 or claim 4 wherein orientation directions of fibres in the outer layers are substantially orthogonal.

9. A fabric according to claim 1 wherein the surface layers include or consist of thermoplastic polymeric fibres consisting of a polymer selected from the group consisting of polyesters, polyamides, copolyesters and copolyamides.

10. A fabric according to claim 9 wherein the thermoplastic fibres are bicomponent fibres.

11. A process for the production of a fabric according to claim 1 wherein at least two highly ordered fibre webs are passed through the nip of a hot calender press at least one roll of which bears a pattern of discrete lands in which the maximum distance between lands measured in the direction of fibre orientation of a surface web is not more than 10 mm and the lands are so arranged that a projection of the lands within this maximum distance, in the direction of fibre orientation, onto a line perpendicular to the direction of fibre orientation is continuous.

12. A process for the production of a fabric according to claim 1 wherein at least two highly ordered fibre webs are passed between the horn and the anvil of an ultrasonic bonding device, at least the anvil bearing a pattern of discrete lands in which the maximum distance between lands measured in the direction of fibre orientation of a surface web is not more than 10 mm and the lands are so arranged that a projection of the lands within this maximum distance onto a line perpendicular to the direction of fibre orientation is continuous.

13. A process for the production of a fabric according to claim 1 wherein at least one highly ordered fibre web is passed between the horn and the anvil of an ultrasonic bonding device, at least the anvil bearing a pattern of discrete lands in which the maximum distance between lands measured in the direction of fibre orientation of a surface web is not more than 10 mm and the lands are so arranged that a projection of the lands within this maximum distance onto a line perpendicular to the direction of fibre orientation is continuous.

* * * * *

UNITED STATES PATENT AND TRADEMARK OFFICE
CERTIFICATE OF CORRECTION

PATENT NO. : 4,188,436
DATED : February 12, 1980
INVENTOR(S) : Peter M. Ellis and Alan Selwood It is certified that error appears in the above—identified patent and that said Letters Patent is hereby corrected as shown below:

Please insert the following on the front page format:

--[63] Related U.S. Application Data
Continuation-in-part of Serial No. 785,941 filed April 8, 1977, abandoned.--

Signed and Sealed this

Twenty-first Day of October 1980

[SEAL]

Attest:

SIDNEY A. DIAMOND

Attesting Officer

Commissioner of Patents and Trademarks